US012611686B2

(12) United States Patent
Willig et al.

(10) Patent No.: US 12,611,686 B2
(45) Date of Patent: Apr. 28, 2026

(54) RECLAIMING PAINT CARTRIDGE DELIVERY CONTROL LIQUID

(71) Applicant: Toyota Motor Engineering & Manufacturing North America, Inc., Plano, TX (US)

(72) Inventors: Steve Willig, New Dundee (CA); Kevin Pesall, Delhi (CA); Chris Bakker, Brantford (CA)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 219 days.

(21) Appl. No.: 18/536,391

(22) Filed: Dec. 12, 2023

(65) Prior Publication Data

US 2025/0187028 A1 Jun. 12, 2025

(51) Int. Cl.
*B05B 7/24* (2006.01)

(52) U.S. Cl.
CPC .................................. *B05B 7/2494* (2013.01)

(58) Field of Classification Search
CPC ... B05B 7/2494; B05B 14/00; B05C 11/1007; B05C 11/1039; B05C 13/02; B05C 5/001; B05C 5/02
USPC ............................................................ 141/18
See application file for complete search history.

(56) References Cited

U.S. PATENT DOCUMENTS

| | | | | |
|---|---|---|---|---|
| 6,253,800 | B1 * | 7/2001 | Yoshida | B05B 3/1064 141/285 |
| 6,612,345 | B1 | 9/2003 | Hosoda et al. | |
| 6,742,722 | B2 | 6/2004 | Hosoda et al. | |
| 7,931,171 | B2 | 4/2011 | Hamamura et al. | |
| 8,016,001 | B2 | 9/2011 | Yamasaki et al. | |
| 8,042,579 | B2 | 10/2011 | Matsumoto | |
| 8,807,391 | B2 | 8/2014 | Onda | |
| 9,126,817 | B2 * | 9/2015 | Yamauchi | B05B 15/55 |
| 9,174,233 | B2 | 11/2015 | Nabeshima et al. | |
| 11,478,811 | B2 | 10/2022 | Kuniharu et al. | |
| 2024/0109107 | A1 * | 4/2024 | Yamauchi | B41J 2/1707 |

* cited by examiner

*Primary Examiner* — Christopher M Afful
(74) *Attorney, Agent, or Firm* — Christopher G. Darrow; Darrow Mustafa PC

(57) ABSTRACT

Systems described herein relate to reclaiming and reusing delivery control liquid (DCL) from a paint cartridge. In one embodiment, a system includes a cartridge mount to receive a paint cartridge that has a paint bag surrounded by a DCL region. The system also includes a mounting plate coupled to the cartridge mount. The mounting plate includes 1) an air inlet port to open an inlet check valve of the cartridge and introduce air into the DCL region and 2) an outlet port to open an outlet check valve of the cartridge and evacuate the DCL region. The system also includes a piston to depress the cartridge onto the mounting plate to open the inlet check valve and the outlet check valve.

10 Claims, 5 Drawing Sheets

RECLAIMING PAINT CARTRIDGE DELIVERY CONTROL LIQUID

TECHNICAL FIELD

The subject matter described herein relates, in general, to painting systems and, more particularly, to reclaiming delivery control liquid (DCL) used to expel paint from an atomizing paint coater.

BACKGROUND

When painting certain objects, such as automobile bodies, it may be highly desirable to have a smooth, even, and high-quality painted surface. Manufacturers may use paint atomization systems, which are high-precision and highly efficient paint systems, to provide the desired smoothness and finish quality. In general, paint atomization systems use an applied force to break up bulk paint into small droplets, which are then directed to a target object. Some paint atomization systems rely on air as the droplet-forming mechanism. A pneumatic paint atomization system includes a nozzle that sprays air and paint. The air mixes with the flowing stream of paint to break the paint up into small droplets. The airflow and paint flow direct the paint droplets away from the nozzle to the target object. As another example, a spray nozzle may include a rotary cup that spins. Paint flows from a center port and moves across the surface of the cup. Centrifugal forces generate paint strings on the surface of the cup that are formed into droplets and propelled toward the target object. As another example, an electrostatic paint system relies on electrostatic forces, rather than pneumatic forces, to apply the paint. In an electrostatic paint system, the nozzle negatively charges paint particles and sprays them toward the target object. The negatively charged paint particles are attracted to the target object that is electrically grounded.

In any case, a paint cartridge supplies the coating device (e.g., a nozzle) with paint to be applied to the target object. In some cases, the paint cartridge includes 1) a paint bag and 2) a delivery control liquid (DCL) region that surrounds the paint bag. A DCL supply system pushes paint from the paint bag by supplying DCL to the DCL region that surrounds the paint bag.

SUMMARY

In one embodiment, example systems and methods relate to a manner of improving delivery control liquid (DCL) usage by reclaiming DCL from a used paint cartridge, which DCL can be used in subsequent painting operations.

In one embodiment, a DCL reclamation system for reclaiming DCL from a paint cartridge is disclosed. The DCL reclamation system includes a cartridge mount to receive a paint cartridge. The paint cartridge includes a paint bag surrounded by a DCL region. The DCL reclamation system also includes a mounting plate coupled to the cartridge mount. The mounting plate includes 1) an air inlet port to open an inlet check valve of the cartridge and introduce air into the DCL region and 2) an outlet port to open an outlet check valve of the cartridge and expel DCL from the DCL region. The DCL reclamation system also includes a piston to depress the cartridge onto the mounting plate to open the inlet check valve and the outlet check valve.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
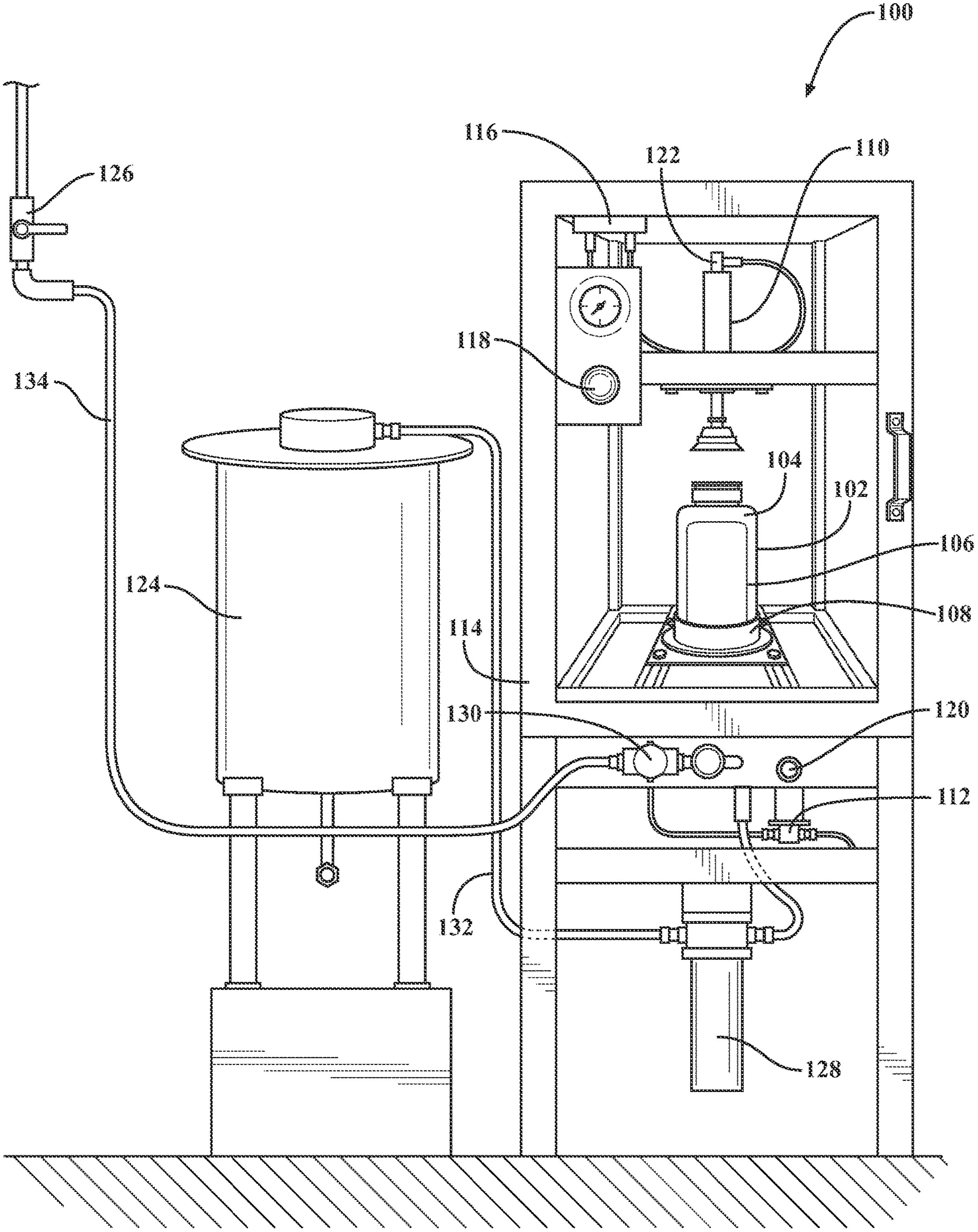
FIG. 1 illustrates one embodiment of a delivery control liquid (DCL) reclamation system for reclaiming DCL from a paint cartridge.

Systems associated with improving the efficiency of delivery control liquid (DCL) use by recycling DCL are disclosed herein. As previously described, paint cartridges used for painting vehicles include a lamination bag inside the paint cartridge. The paint is contained within the lamination bag, while DCL inside the cartridge surrounds the lamination bag. During operation, DCL is pumped into the paint cartridge to displace the paint towards a nozzle or spray head. During refill, paint is pumped into the lamination bag, which displaces the DCL.

Over time and due to an end of life of the paint cartridge or an unexpected event, paint cartridges may become damaged and/or worn out, such that the paint cartridges may need to be repaired or replaced. Paint cartridges due for life cycle replacement, repair, or that are no longer required may still include DCL residue. Existing equipment, such as a vehicle spray robot, can add DCL to spray the paint during application, but cannot remove the DCL. Cartridge transfer machines and manual filling stations can add DCL or paint to a paint cartridge, but cannot remove both fluids as desired during replacement and/or repair. As such, removal of both the paint and DCL from a paint cartridge is complex and may require disassembling the paint cartridge and manually extracting the DCL from the paint cartridge. Disassembling the paint cartridge exposes a technician to the potentially harmful DCL and triggers a rebuild of the paint cartridge before it can be reused.

As such, the present specification describes a DCL reclamation system that can safely remove the DCL from paint cartridges such that the DCL can be appropriately disposed of or reused in subsequent paint operations. In general, the DCL reclamation system includes an enclosure. Inside the enclosure is a cartridge mount to receive a paint cartridge. An operator opens the door to the enclosure, places a cartridge in the cartridge mount, and closes the door. As the door is closed, a piston extends to press the paint cartridge down into a mounting plate of the cartridge mount. This pressing down by the piston opens check valves that are on the interior of the cartridge but outside of the paint bag. An operator activates a switch to introduce a low-pressure airflow through an inlet check valve, displacing the DCL through an outlet check valve. The DCL exits from the bottom of the cartridge into a reclamation reservoir. Once evacuated, the operator releases the switch to stop airflow to the paint cartridge. The operator opens the door, retracting the piston to release the paint cartridge for removal.

In this way, the disclosed systems 1) reduce the consumption of DCL, 2) reduce exposure of the operator to potentially harmful chemicals as the DCL is wholly contained within a piping system of the DCL reclamation system, 3) reduce the time and effort for rebuilding paint cartridges, 4) reduce chemical waste, and 5) can be used in hazardous areas as the DCL reclamation system is air-powered.

Turning now to the figures, FIG. 1 illustrates one embodiment of a DCL reclamation system 100 for reclaiming DCL from a paint cartridge 102. It will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, the DCL reclamation system 100 is implemented to perform methods and other functions as disclosed herein relating to improving the usage of DCL in a manufacturing facility.

As described above, the DCL reclamation system 100 receives a paint cartridge 102. The paint cartridge 102 may include a paint bag 106 surrounded by a DCL region 104. During painting, the paint cartridge 102 is selectively attached to a paint system that includes a coating device such as a pneumatic or electrostatic spray nozzle. The paint cartridge 102 may be formed of a rigid material such as glass, metal, or plastic and generally has a cylindrical shape. However, the paint cartridge 102 may have another shape and be formed of another material.

Within the paint cartridge 102 is a paint bag 106, which is made of a flexible material and houses the paint that is to be applied to a target object (e.g., a vehicle). As described above, paint is provided from the paint cartridge 102 to the spray nozzle via the introduction of DCL into the DCL region 104. That is, moving DCL into the DCL region 104 displaces paint from the paint bag 106 towards a spray nozzle. By comparison, moving paint into the paint bag 106 (for example, during paint refill) displaces DCL from the DCL region 104 to a DCL reservoir coupled to the paint system.

Figure 3A:
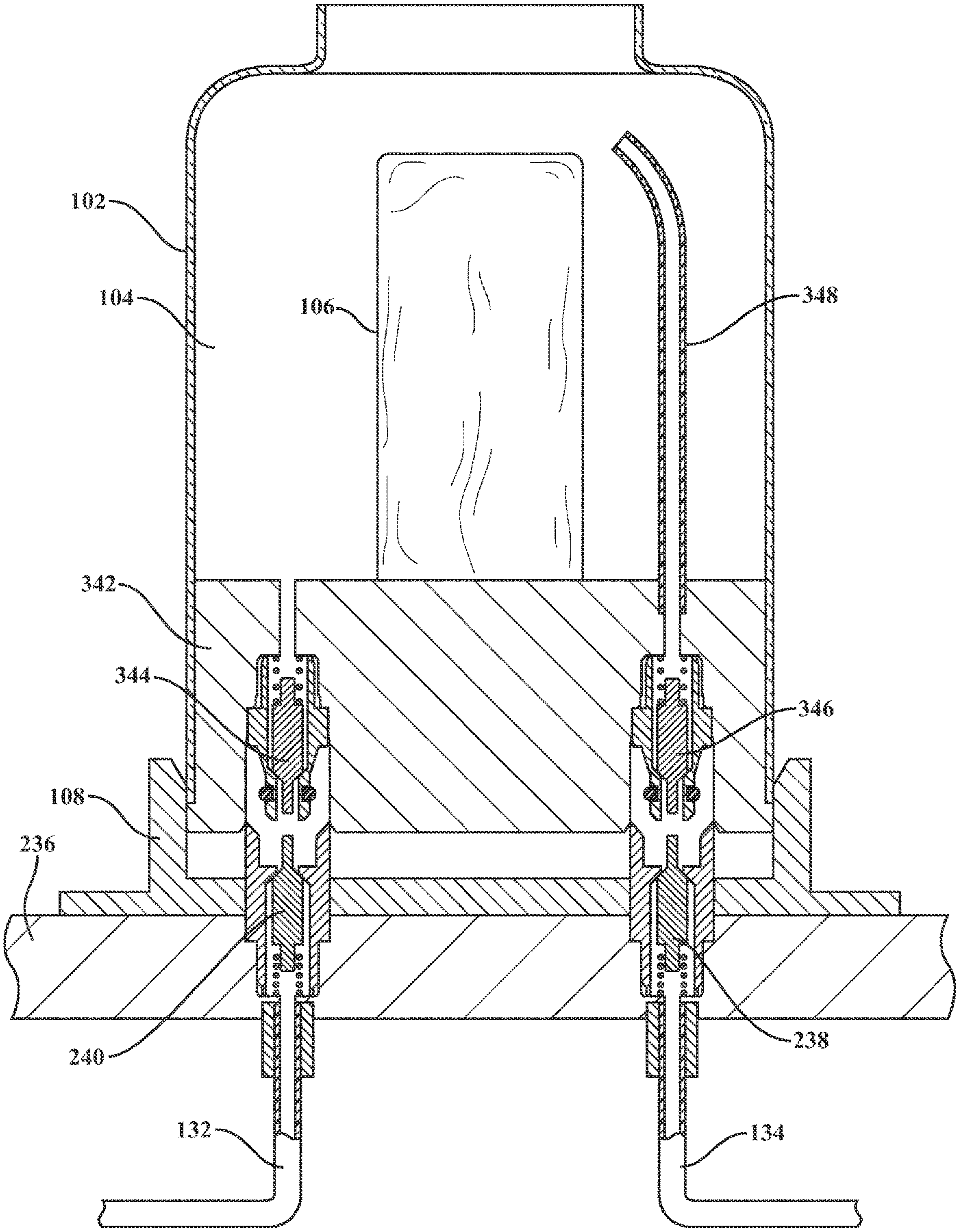
FIGS. 3A and 3B illustrate the action of the piston to open the check valves of the paint cartridge.
Figure 3B:
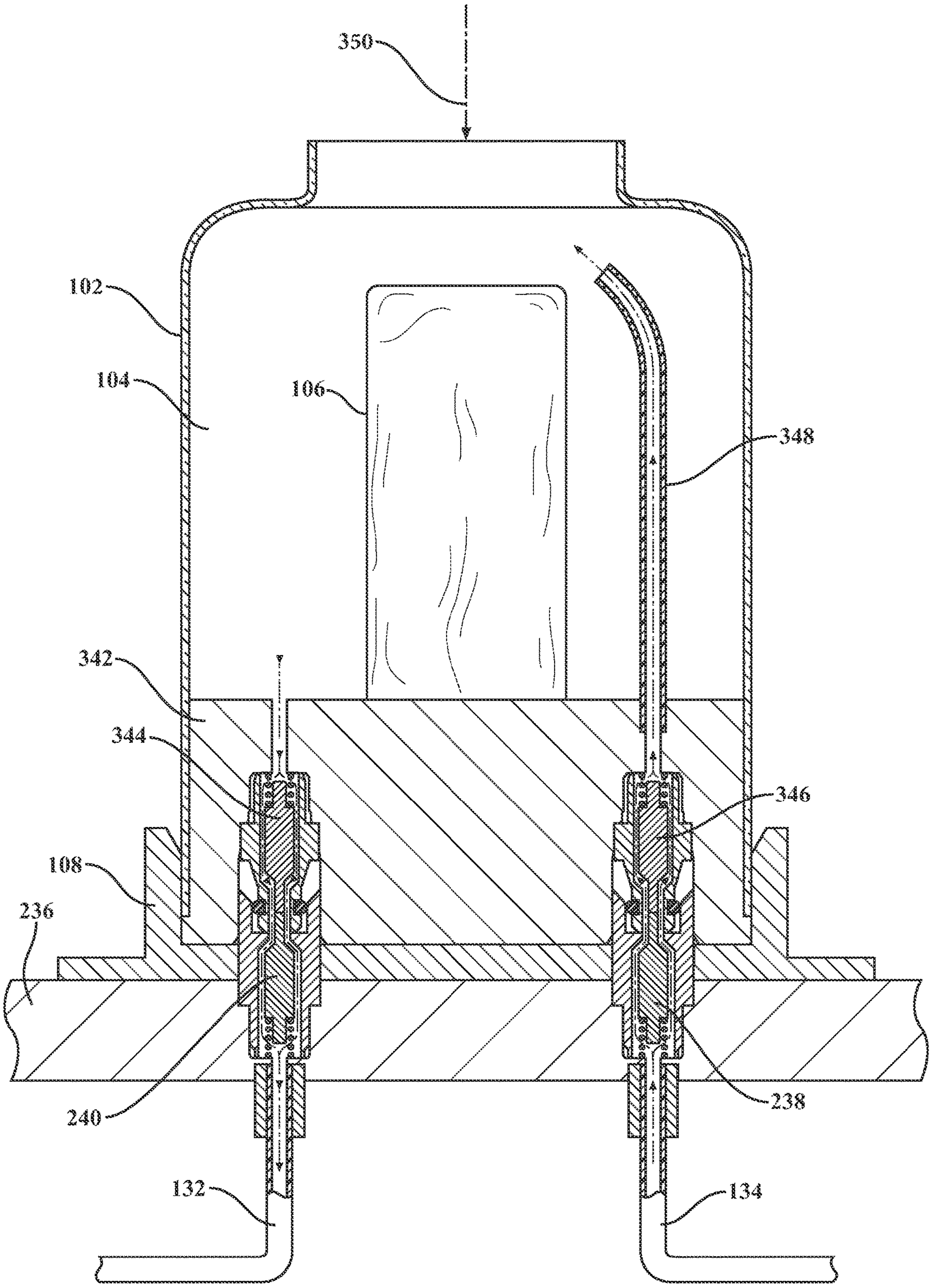

As depicted in FIGS. 3A and 3B, the paint cartridge 102 includes a base 342 through which the paint cartridge 102 is attached to the paint system. Also as depicted in FIGS. 3A and 3B, the base 342 includes supply ports through which DCL is introduced into the DCL region 104 and expelled from the DCL region 104 during painting and paint refill, respectively. Within these supply ports are check valves that either allow DCL flow or prevent DCL flow. That is, during transport or when the paint cartridge 102 is not attached to a paint system, it may be desirable to prevent leakage of DCL. As such, when unattached to a paint system, refill system, or the DCL reclamation system 100, the check valves are closed to prevent DCL flow into and out of the paint cartridge 102. When inserted into a DCL reclamation system 100, these valves are opened to introduce air into the DCL region 104.

Over time, a paint cartridge 102 may need to be repaired or replaced. In such a case, paint may be removed, for example, via the operation of the spray nozzle. However, DCL may remain in the DCL region 104 surrounding the paint bag 106. As described above, systems may exist for removing one of the paint or the DCL via the introduction of the other fluid (e.g., paint or DCL), but these systems may be incapable of completely removing both the paint and DCL from a paint cartridge 102 without disassembling the paint cartridge 102. To effectuate such, the present DCL reclamation system 100 introduces air into the DCL region 104 of a paint cartridge 102 to expel any residual DCL from the DCL region 104.

In general, the DCL reclamation system 100 includes a cartridge mount 108 to receive a paint cartridge 102. In general, the cartridge mount 108 includes walls that extend up from the surface to receive and hold the base 342 of the paint cartridge 102 during the DCL reclamation operation. That is, the cartridge mount 108 may have the same shape as a base 342 section of the paint cartridge 102 and may be larger than the paint cartridge 102 to receive the paint cartridge 102 within the walls of the cartridge mount 108. The cartridge mount 108 may also include apertures through which ports of the DCL reclamation system 100 pass to interact with check valves of the paint cartridge 102, as depicted in FIGS. 2A-3B.

The DCL reclamation system 100 further includes a mounting plate coupled to the cartridge mount 108. As described in greater detail in connection with FIGS. 2A-3B, the mounting plate includes an air inlet port to open an inlet check valve of the paint cartridge 102. This air inlet port introduces air into the DCL region 104. That is, the air inlet port is coupled to an air supply 126 through a supply line 134. Various pneumatic components are placed along the supply line 134 to regulate airflow through the DCL reclamation system 100.

The mounting plate further includes an outlet port to open an outlet check valve of the paint cartridge 102. Residue DCL is expelled from the DCL region 104 through this outlet port. As such, the DCL reclamation system 100 may include a DCL reclamation reservoir 124 coupled to the outlet port through a reclamation line 132. In an example, certain components may be placed along the reclamation line 132 to process extracted DCL.

The DCL reclamation system 100 further includes a piston 110 that depresses the paint cartridge 102 onto the mounting plate to open the inlet check valve and outlet check valve of the paint cartridge 102. That is, as described above, the inlet check valve and outlet check valve are biased (for example, via a spring) to be closed such that the DCL does not readily flow into and out of the paint cartridge 102, which may result in spilled DCL over a manufacturing floor. The piston 110, which may be pneumatic, may press down on the paint cartridge 102 with a force to open the check valves, as depicted in FIGS. 3A and 3B. As such, the piston 110 may be coupled to the air supply 126, which provides the pneumatic pressure to activate and translate the piston 110 to compress the paint cartridge 102 into the mounting plate to establish an airflow path through the DCL reclamation system 100. In an example, the piston 110 may press down on the paint cartridge 102 with a force of between five to ten pounds.

In an example, the piston 110 may be biased, for example via a spring, towards a retracted state where it is not pressing down on a paint cartridge 102. As such, upon removal of the airflow, the piston 110 may retract, allowing for the removal of the paint cartridge 102. In an example, the piston 110 may include a rubberized head to contact and press down on the paint cartridge 102. Such a rubberized head ensures that the paint cartridge 102 is not damaged and generates a friction force that retains the paint cartridge 102 in place.

As described above, various components may be located along the supply line 134 to regulate or otherwise alter the airflow through the DCL reclamation system 100. Specifically, rather than continuously providing airflow to the piston 110 and the air inlet port, the DCL reclamation system 100, it may be desirable to facilitate operator control of airflow. Various components that control the airflow through the DCL reclamation system 100 will now be described.

In an example, the DCL reclamation system 100 may include a dump valve 112 along the supply line 134 to regulate airflow to the air inlet port and the piston 110. When closed, the dump valve 112 prevents air from the air supply 126 from reaching the air inlet port and the piston 110. When a paint cartridge 102 is installed, the dump valve 112 may be opened so that air from the air supply 126 extends the piston 110. For example, the dump valve 112 may be pilot-air-operated. That is, pressurized air may switch the dump valve 112 from a closed state where no air is allowed to pass to the piston 110 to an open state where air is allowed to extend the piston 110.

In an example, the DCL reclamation system 100 further includes an enclosure 114 in which the cartridge mount 108, mounting plate, and piston 110 are disposed. The enclosure 114 may be a standing enclosure made of a transparent material such that an operator can observe the DCL reclamation process. In another example, the enclosure 114 is formed of another material, such as metal. In an example, the DCL reclamation system 100 further includes a pneumatic door switch 116 along the supply line 134. The pneumatic door switch 116 operates to allow or block airflow to downstream components, one of which may be the previously described dump valve 112. Specifically, the pneumatic door switch 116 provides the switching airflow to the dump valve 112. When the door of the enclosure 114 is opened, the pneumatic door switch 116 may prevent airflow from opening the dump valve 112. By comparison, when an operator shuts the door of the enclosure 114, the pneumatic door switch 116 opens, allowing pilot air to pass to the dump valve 112, which pilot air opens the dump valve 112. As described above, an open dump valve 112 allows air from the supply line 134 to reach the air inlet port and extend the piston 110 to press down on the paint cartridge 102. As such, during DCL reclamation, closing the door of the enclosure 114 triggers the extension of the piston 110 to seat the paint cartridge 102 in the cartridge mount 108.

When an operator opens the door, the pneumatic door switch 116 closes, thus preventing the pilot airflow to the dump valve 112. Without the pilot airflow, the dump valve 112 closes, thus cutting off the airflow to the air inlet port and the piston 110. As the piston 110 is biased towards the retracted position, cutting off the airflow to the piston 110 causes the piston to retract. As such, during DCL reclamation, opening the door of the enclosure 114 triggers the retraction of the piston 110 to allow for the removal of the paint cartridge 102.

In an example, the airflow that would otherwise pass through the air inlet port into the DCL region 104 as the door is closed may further be regulated by an additional component along the supply line 134. In this example, the DCL reclamation system 100 may include a reclamation trigger 118 along the supply line 134 between the dump valve 112 and the air inlet port. The reclamation trigger 118 activates DCL reclamation by introducing pressurized air into the DCL region 104. Specifically, the reclamation trigger 118 1) provides the airflow to the air inlet port when activated and 2) blocks the airflow to the air inlet port when inactivated. In an example, the reclamation trigger 118 may be a button that is activated and thus allows airflow when depressed and inactivated and blocks airflow when released. As such, to effectuate DCL reclamation, an operator may continually depress the button and terminate the reclamation process by releasing the button. The pneumatic door switch 116 and the reclamation trigger 118 provide for the sequential, rather than simultaneous, activation of the piston 110 and the reclamation process. That is, the pneumatic door switch 116 may provide airflow to the piston 110 and the reclamation trigger 118. However, in this example, airflow is not provided to the air inlet port until the reclamation trigger 118 is activated.

It may be that the air from the air supply 126 is at a higher pressure than desired for DCL reclamation. As such, the DCL reclamation system 100 may include a pressure regulator 120 along the supply line 134 to alter (e.g., reduce) the airflow pressure to the air inlet port and the piston 110. As a specific example, the pressure regulator 120 may reduce the pressure of the air from the air supply 126 to between 0.10 megaPascals (MPa) and 0.25 MPa, and more specifically to between 0.15 MPa and 0.20 MPa.

In some cases, regulating the rate at which air flows to the piston 110 may be desirable. For example, if the airflow is too great, the piston 110 may extend very quickly, damaging the paint cartridge 102 and/or the components of the mounting plate. As such, the DCL reclamation system 100 may include a flow control device 122 along the supply line 134 between the dump valve 112 and the piston 110 to regulate the flow rate of the air to the piston 110.

In an example, the DCL reclamation system 100 includes a safety release valve 130 along the supply line 134 to discharge pressure from the DCL reclamation system 100. That is, for various reasons, an operator may wish to terminate the DCL reclamation process. In this example, the operator may manually press or activate the safety release valve 130 to expel pressure from the DCL reclamation system 100.

In addition to airflow regulating components along the supply line 134, the DCL reclamation system 100 may include components along the reclamation line 132 of the DCL reclamation system 100. For example, expelled DCL may pass through a DCL filter 128, where debris and other contaminants are removed from the DCL. Filtering the DCL ensures that the DCL is free of contaminants or other debris that may clog the paint system lines or otherwise damage the paint cartridge 102 during painting. Once the DCL has passed through the DCL filter 128, it may be carried by the reclamation line 132 to a reclamation reservoir 124, where the DCL is stored. Additional details regarding air and DCL flow through the DCL reclamation system 100 are provided below in connection with FIG. 4.

As such, the present DCL reclamation system 100 allows for the extraction of DCL from an empty paint cartridge 102 without disassembling the paint cartridge 102 and manually extracting the DCL. As such, DCL may be used more effectively, efficiently, and responsibly in a manufacturing facility. Moreover, paint operations are expedited as paint cartridges 102 are not disassembled and rebuilt during replacement and/or repair. Furthermore, operator safety is promoted as the operator is not exposed to the potentially harmful residual DCL in the paint cartridge 102.

Figure 2A:
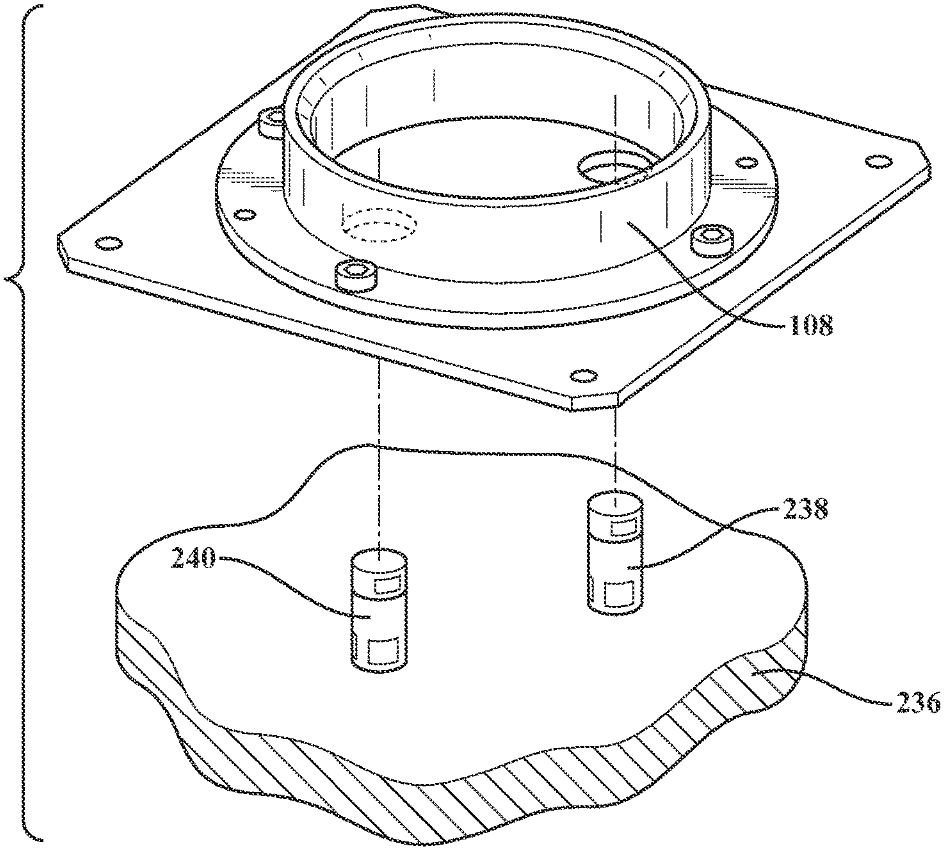
FIGS. 2A and 2B illustrate the cartridge mount and mounting plate of the DCL reclamation system.
Figure 2B:
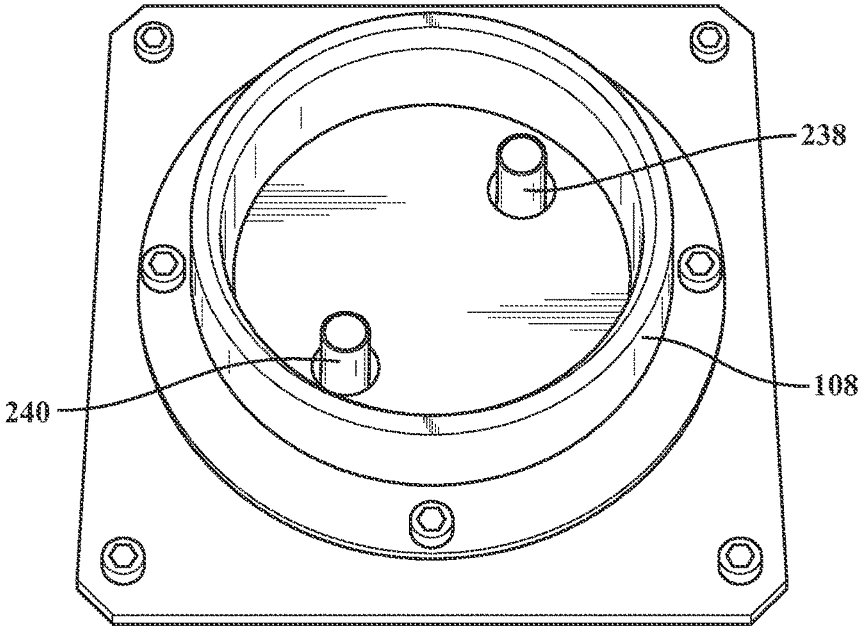

FIGS. 2A and 2B illustrate the cartridge mount 108 and mounting plate 236 of the DCL reclamation system 100. Specifically, FIG. 2A depicts an exploded view of the cartridge mount 108 and the mounting plate 236 and FIG. 2B depicts an assembled view of the cartridge mount 108 and the mounting plate 236 within the enclosure 114 described above. As described above, the cartridge mount 108 includes a base plate with walls that extend upward. The cartridge mount 108 aligns the paint cartridge 102 and holds the paint cartridge 102 in place as the piston 110 extends down to seat the paint cartridge 102.

As described above, the mounting plate 236 includes a pair of ports. First, an air inlet port 238, which may include a check valve, interacts with an inlet check valve 346, depicted in FIGS. 3A and 3B, of the paint cartridge 102 to establish a fluidic path between an air supply 126 and the DCL region 104 of the paint cartridge 102. The mounting plate 236 also includes an outlet port 240, which may include a check valve. The outlet port 240 interacts with the outlet check valve 344, depicted in FIGS. 3A and 3B, of the paint cartridge 102 to establish a fluidic path between the DCL region 104 of the paint cartridge 102 and the reclamation reservoir 124 of the DCL reclamation system 100.

FIGS. 3A and 3B illustrate the action of the piston 110 to open the check valves 344 and 346 of the paint cartridge 102. Specifically, FIG. 3A depicts the paint cartridge 102 in the cartridge mount 108 before the extension of the piston 110 and FIG. 3B depicts the paint cartridge 102 in the cartridge mount 108 while the piston 110 exerts a downward force on the paint cartridge 102.

As described above, the paint cartridge 102 may include a base 342, which houses various check valves 344 and 346. Specifically, an inlet check valve 346 delivers DCL into the DCL region 104, which DCL displaces paint in the paint bag 106 towards the spray nozzle during painting. The base 342 also includes an outlet check valve 344, which delivers the DCL to a storage tank in a paint system. That is, the injection of paint into the paint bag 106 during paint refill displaces the DCL in the DCL region 104 towards the storage tank of the paint system.

In the present DCL reclamation system 100, these check valves 344 and 346 are used to introduce air into the DCL region 104, which expels the DCL from the DCL region 104. Note that as depicted in FIGS. 3A and 3B, in some examples, a DCL inlet tube 348 coupled to the inlet check valve 346 may deliver DCL to a top portion of the DCL region 104.

As described above, when the door of the enclosure 114 is shut, the dump valve 112 is opened such that airflow from the air supply 126 travels through the supply line 134 to the piston 110. The airflow extends the piston 110, which pushes down on the paint cartridge 102 as indicated by the arrow 350 in FIG. 3B. The extension of the piston 110 1) brings the air inlet port 238, with its associated check valve, into contact with the inlet check valve 346 of the paint cartridge 102 and 2) brings the outlet port 240, with its associated check valve, into contact with the outlet check valve 344 of the paint cartridge 102. The piston force compresses the springs in respective check valves and exposes openings in the respective check valves. As such, an extension of the piston 110 creates a fluidic path from the air supply 126, through the supply line 134, into the DCL region 104 through the air inlet port 238 and inlet check valve 346 of the paint cartridge, and finally out through the outlet check valve 344, outlet port 240, and to the reclamation reservoir 124 through the reclamation line 132.

Figure 4:
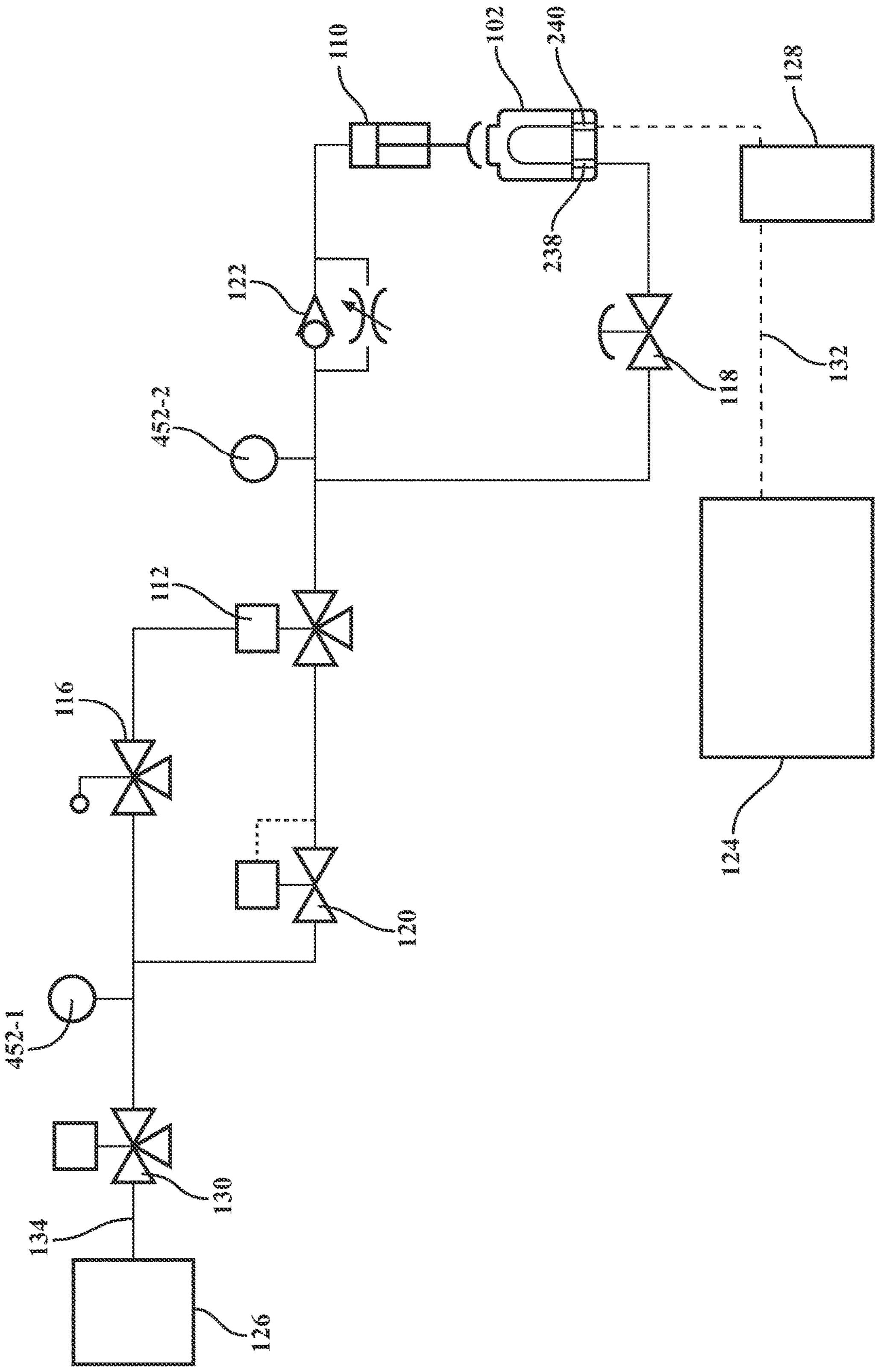
FIG. 4 illustrates a flow of air and DCL through the DCL reclamation system.

FIG. 4 illustrates a flow of air and DCL through the DCL reclamation system 100. Specifically, airflow through the DCL reclamation system 100 is depicted by solid lines, while DCL flow through the DCL reclamation system 100 is indicated in dashed lines. As described above, air is provided to the DCL reclamation system 100 through a supply line 134 connected to an air supply 126. In an example, the air is supplied at a pressure of between 0.5 and 1.0 MPa, for example, 0.8 MPa.

The air supply 126 is coupled via the supply line 134 to an inlet port of a safety release valve 130. Via the safety release valve 130, an operator may quickly discharge the entire DCL reclamation system 100 for various reasons. In an example, air on an outlet port of the safety release valve may be at a pressure of between 0.2 MPa and 0.5 MPa, for example, 0.4 MPa. When the safety release valve 130 is locked (e.g., preventing air from entering the DCL reclamation system 100), air may be vented through a muffler coupled to a safety release valve 130 vent port. In addition to those components described above, the DCL reclamation system 100 may include a number of pressure gauges 452-1 and 452-2 that monitor the pressure at various points within the DCL reclamation system 100. Via these gauges 452-1 and 452-2, an operator may monitor DCL reclamation pressures and adjust or stop the process as needed.

In an example, the outlet port of the safety release valve 130 provides air to two branches of the supply line 134. A first branch provides air to the pneumatic door switch 116 at a first pressure (e.g., between 0.2 MPa and 0.5 MPa, for example, 0.4 MPa) while a second branch provides the air to a pressure regulator 120, which pressure regulator 120 may reduce the pressure of air that passes to the piston 110 and the air inlet port 238 to below the first pressure (e.g., between 0.15 MPa and 0.20 MPa). That is, it may be that a higher pressure is desired to open the dump valve 112 while a lesser pressure is desired for the operation of the piston 110 and the DCL reclamation. In an example, the pressure regulator 120 may reduce the air pressure to be within the operating range of the paint cartridge 102. For example, the operating range of the paint cartridge may be between 0.1 MPa and 0.3 MPa. Reducing the air pressure provided to the piston 110 does not impact the ability of the piston 110 to press down on the paint cartridge 102 as the force to hold the paint cartridge 102 is around 5 kilograms (kg), and the reduced pressure provides ample force to hold the paint cartridge 102 without placing undue pressure on the paint cartridge 102.

Air in the first branch is directed to the pneumatic door switch 116, allowing air to pass to a pilot port of the dump valve 112 if opened. Opening the dump valve 112 allows the air to pass to 1) the piston 110 to seat the paint cartridge 102 and 2) the reclamation trigger 118. That is, as described above, closing the door causes the piston 110 to extend and press the paint cartridge 102 into the cartridge mount 108. In an example, when pressure is removed from the dump valve 112 pilot port (e.g., by opening the door of the enclosure 114), pressure is vented out a vent port of the dump valve 112, potentially through a sound muffler.

As described above, to ensure the piston 110 does not move in a fashion that could damage the paint cartridge 102 or other components, the airflow passes through a flow control device 122, which gates the piston 110 extension rate. That is, the flow control device 122 restricts the airflow to provide a slow clamping action.

When ready to evacuate the DCL from the paint cartridge 102, an operator activates the reclamation trigger 118, which may be a button, to allow the airflow to pass into the paint cartridge via the air inlet port 238 and towards the interior top of the DCL region 104. As described above, the reclamation trigger 118 may be such that the operator continually depresses the trigger to perform DCL reclamation. While depressed, air enters the DCL region 104 and expels DCL through the outlet port 240 through a reclamation line 132. When the DCL region 104 is empty, air will pass through this portion of the reclamation line 132. As it moves through the reclamation line 132 towards a reclamation reservoir

124, the DCL may pass through a filter 128 wherein it is processed, filtered, and/or otherwise cleansed.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

The flow diagrams in the figures illustrate the architecture, functionality, and operation of possible implementations of systems according to various embodiments.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:

a cartridge mount to receive a paint cartridge comprising a paint bag surrounded by a delivery control liquid (DCL) region;

a mounting plate coupled to the cartridge mount, the mounting plate comprising:

an air inlet port to open an inlet check valve of the paint cartridge and introduce air into the DCL region; and an outlet port to open an outlet check valve of the paint cartridge and evacuate the DCL region; and a piston to depress the paint cartridge onto the mounting plate to open the inlet check valve and the outlet check valve.

2. The system of claim 1, further comprising a dump valve in a supply line to regulate airflow to the air inlet port and the piston.

3. The system of claim 2, further comprising:

an enclosure in which the cartridge mount, the mounting plate, and the piston are disposed; and a pneumatic door switch in the supply line to:

open the dump valve to introduce the airflow to the air inlet port and extend the piston when a door of the enclosure is shut; and close the dump valve to cut off the airflow to the air inlet port and retract the piston when the door is opened.

4. The system of claim 3, further comprising a reclamation trigger in the supply line between the pneumatic door switch and the air inlet port to:

provide the airflow to the air inlet port when activated; and block the airflow to the air inlet port when inactivated.

5. The system of claim 4, wherein the reclamation trigger is a button that is activated when depressed and inactivated when released.

6. The system of claim 2, further comprising a flow control device in the supply line between the dump valve and the piston to regulate a flow rate of the airflow to the piston.

7. The system of claim 2, further comprising a pressure regulator in the supply line to alter a pressure of the airflow to the air inlet port and the piston.

8. The system of claim 1, further comprising:

an air supply coupled to the air inlet port; and a DCL reclamation reservoir coupled to the outlet port through a reclamation line.

9. The system of claim 8, further comprising a DCL filter along the reclamation line between the outlet port and the DCL reclamation reservoir.

10. The system of claim 1, further comprising a safety release valve in a supply line to discharge pressure from the system.

* * * * *